A. F. RIETZEL.
COMPOSITE SHEET METAL WORK.
APPLICATION FILED APR. 14, 1908.

1,020,056.

Patented Mar. 12, 1912.

WITNESSES:

INVENTOR
Adolph F. Rietzel
BY
Townsend & ???
ATTORNEYS

UNITED STATES PATENT OFFICE.

ADOLPH F. RIETZEL, OF STONINGTON, CONNECTICUT, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

COMPOSITE SHEET-METAL WORK.

1,020,056.      Specification of Letters Patent.      Patented Mar. 12, 1912.

Application filed April 14, 1908. Serial No. 426,959.

*To all whom it may concern:*

Be it known that I, ADOLPH F. RIETZEL, a citizen of the United States, and a resident of Stonington, in the State of Connecticut, have invented certain new and useful Improvements in Composite Sheet-Metal Work, of which the following is a specification.

My invention relates to sheet metal work of the kind in which the sheet metal structure is a composite one, comprising two or more sheets of metal fastened together face to face on their plane surfaces by a multiplicity of distinct or separated points of electrically united union as described in my prior application for patent filed Feb. 24th, 1905, S. N. 247,081. In structures of this character, it is frequently desirable that after the fastening of the plates together has been effected by pressure applied to the plates while in an electric welding machine, there shall be left a distinct space between them, and the object of my present invention is to insure the production of the finished structure with such space.

In the process of making the structure according to the manner described in my prior application, the welded points of union are formed at projected points or portions of the plates which, as therein described, are of such form that the application of the welding pressure will ordinarily result in bringing the plane faces of the plates into direct contact with one another.

My present invention consists essentially in the provision, for each welded point of a base formed out of the metal of the plate and of such form or character that it will not become softened by the application of the current but will remain cold and when the pressure is applied to the plates in sufficient amount to make the weld, said base portion surmounted by the finished welded portion will act as a stop that will keep the plates apart.

Figure 1:
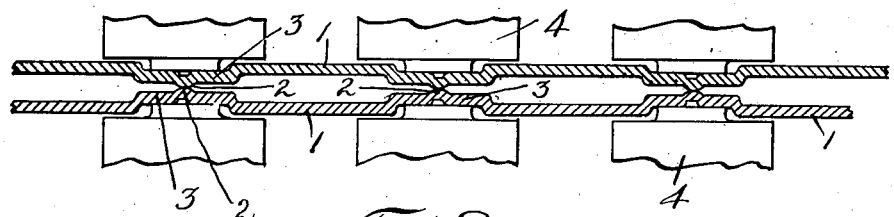
Figure 2:
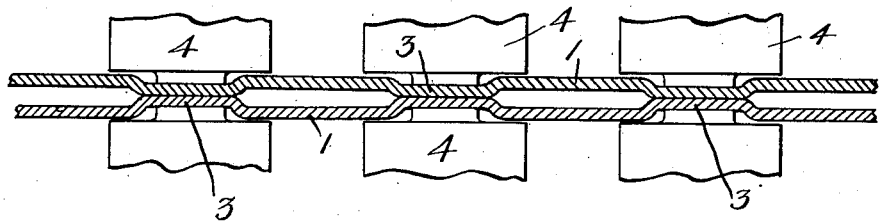
Figure 3:
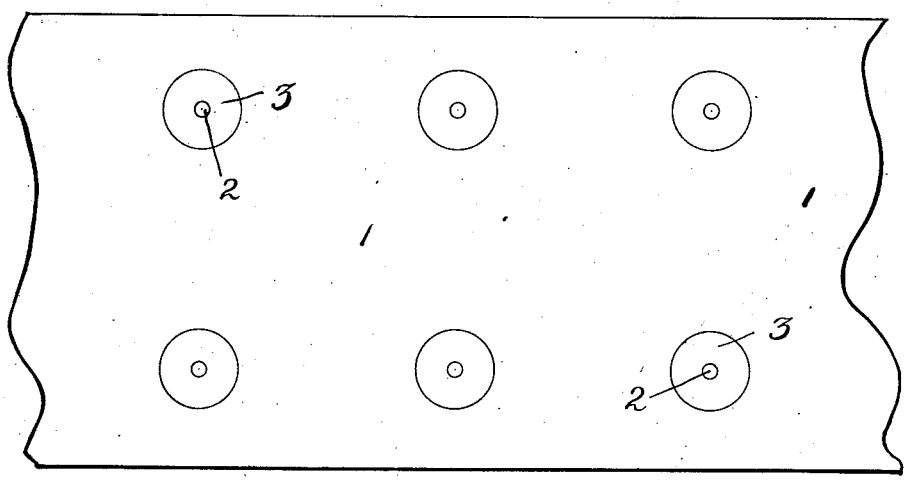
Figure 4:
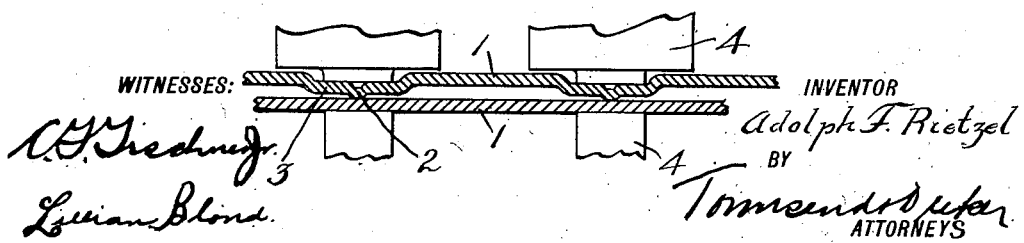

In the accompanying drawings, Figure 1 is a cross section through the two plates, each provided with projections suitable for carrying out my invention, the plates being here shown in the condition prior to the application of the heating current and pressure. Fig. 2 shows the finished work. Fig. 3 shows in plan a portion of the work and illustrates the form of the projection in outline. Fig. 4 illustrates a modification.

Referring to Fig. 1, the two plates to be united are indicated at 1, 1. The projections formed upon the plates preliminary to the operation of securing them together may be described as consisting of two portions, one of which constitutes the extreme portion 2 of the projection, and is the welding projection, while the other portion 3 forms a base portion of the projection surmounted by the portion 2 and does not become deformed or is so little deformed that it serves as a positive means for keeping the plates apart as shown in Fig. 2. As shown, the part 3 of these projections is much larger than the part marked 2, that is to say, the part marked 2 is the only part that heats to welding temperature by the passage of the electric current from one plate to the other through such parts 2, the heat not running back into the part 3 to any great extent, so that this portion of the metal is kept cold when the end pressure is applied to force the plates together hard enough to make a good weld, and they will not come completely together, but will be left in the welded position shown in Fig. 2, in which the part termed the base portion lies wholly below the plane of the welds. This is due to the fact that the base portion 3 is of such small dimensions that it will effectually resist the pressure tending to press it back into the plane of the plate when the welding-end pressure is applied and will act practically as a stop to limit the approach of the plates, leaving the weld surmounting the base so that the plane of the welds will be practically coincident with a plane passing through the top of the base portions 3. The projecting portion 3 is very much larger than the portion 2 and the portion 2 rise from a plane face of the projection 3. In this instance the contact and pressure electrode 4, instead of bearing upon the main surface of the plate may be made to apply the welding pressure within the projecting portion 3 thus localizing the pressure and obviating the tendency of the portion 3 to become forced back into the plane of the plate as would be the tendency if the electrode bore against the surface of the plate between projections as in the arrangement illustrated in Fig. 1. Obviously, the electrodes may fit more or less closely into the projections 3. The part 2 of the double projection is the part which becomes involved in the welding, being the part which is raised to welding temperature by the passage of the electric current from one point to the other, as in the process described in my prior application before referred to, while the base projection 3 becomes the spacing projection and by engagement of its plane face with a face on the opposite plate stops the approach of the plates, leaving the weld surmounting said base and the distance of separation of the plates determined by the height of the plane faces of the projections 3 above the main portion of the plates.

In the various figures, the projections are shown as circular, but it is obvious that they might have any other shape in outline without departing from the invention. Obviously, it is not necessary that the points or projections should be on both of the plates. They may be on one of them only as illustrated in Fig. 4.

What I claim as my invention is:—

1. The method of securing two plates together with a space between them consisting in forming upon a plate a double projection one portion of which is smaller than and surmounts the other or base portion and constitutes a welding projection, assembling the plates face to face, passing a heating electric current from one to the other through said welding projection and forcing the plates together to first weld them by the welding projections and then bring the base portion into engagement thereby determining the space between the plates.

2. The method of securing two plates together with a space between them, consisting in forming a multiplicity of double projections, each comprising two parts, one of which forms a base portion and is very much larger than the other, while the latter projects farther from the plane of the plate than said larger portion, and securing the plates together by applying welding pressure within the base portion until the projection constituting the base portion engages an opposite surface and at the same time passing of heating electric current through the smaller portion of each projection, as and for the purpose described.

3. The method of forming a composite sheet metal structure comprising a number of plates electrically united at a number of distinct points of electrically welded union consisting in forming on the plate a projecting portion having a plane face surmounted by another projection of smaller size or area rising above said plane, arranging the plates together face to face, passing electric current from one to another through the smaller projections and forcing the plates together until the said plane face of the projection engages to determine the amount of space between the plates.

Signed at New York in the county of New York and State of New York this 3d day of April A. D. 1908.

ADOLPH F. RIETZEL.

Witnesses:
C. F. FISCHER, JR.,
LILLIAN BLOND.